(12) United States Patent
Zhang et al.

(10) Patent No.: US 12,277,939 B2
(45) Date of Patent: Apr. 15, 2025

(54) PROGRESSIVE CONTRASTIVE LEARNING FRAMEWORK FOR SELF-SUPERVISED SPEAKER VERIFICATION

(71) Applicant: TENCENT AMERICA LLC, Palo Alto, CA (US)

(72) Inventors: Chunlei Zhang, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 449 days.

(21) Appl. No.: 17/734,471

(22) Filed: May 2, 2022

(65) Prior Publication Data

US 2023/0352029 A1    Nov. 2, 2023

(51) Int. Cl.
*G10L 17/04*    (2013.01)
*G10L 17/02*    (2013.01)
*G10L 21/0208*    (2013.01)

(52) U.S. Cl.
CPC .............. *G10L 17/04* (2013.01); *G10L 17/02* (2013.01); *G10L 21/0208* (2013.01); *G10L 2021/02082* (2013.01)

(58) Field of Classification Search
CPC ..... G10L 17/04; G10L 17/02; G10L 21/0208; G10L 2021/02082
See application file for complete search history.

(56) References Cited

U.S. PATENT DOCUMENTS

| | | | |
|---|---|---|---|
| 10,997,980 | B2 | 5/2021 | Wang et al. |
| 2018/0068675 | A1 | 3/2018 | Variani et al. |
| 2021/0182686 | A1 | 6/2021 | Wang et al. |
| 2021/0295091 | A1 | 9/2021 | Li et al. |
| 2022/0044687 | A1 | 2/2022 | Perret et al. |
| 2023/0089308 | A1* | 3/2023 | Wang .................. G10L 15/063 704/232 |

FOREIGN PATENT DOCUMENTS

WO    2019/027531 A1    2/2019

OTHER PUBLICATIONS

Ke Ding, Xuanji He, Guanglu Wan, "Learning Speaker Embedding with Momentum Contrast", Sep. 6, 2020, arXiv:2001.01986v2 (Year: 2020).*
Wei Xia, Chunlei Zhang, Chao Weng, Meng Yu, Dong Yu, "Self-Supervised Text-Independent Speaker Verification Using Prototypical Momentum Contrastive Learning", Feb. 14, 2021, arXiv:2012.07178v2 (Year: 2021).*
International Search Report dated Jan. 10, 2023 in International Application No. PCT/US22/43319.
Written Opinion of the International Searching Authority dated Jan. 10, 2023 in International Application No. PCT/US22/43319.

* cited by examiner

*Primary Examiner* — Pierre Louis Desir
*Assistant Examiner* — Daniel W Chung
(74) *Attorney, Agent, or Firm* — Sughrue Mion, PLLC (57) ABSTRACT

A method includes receiving, by a first encoder, an original speech segment, receiving, by a second encoder, an augmented speech segment of the original speech segment, generating, by the first encoder, a first speaker representation based on the original speech segment, generating, by the second encoder, a second speaker representation based on the augmented speech segment, and generating a contrastive loss based on the first speaker representation and the second speaker representation.

20 Claims, 5 Drawing Sheets

PROGRESSIVE CONTRASTIVE LEARNING FRAMEWORK FOR SELF-SUPERVISED SPEAKER VERIFICATION

BACKGROUND

1. Field

The disclosure is related generally to self-supervised learning systems and methods.

2. Description of Related Art

Speaker verification (SV) aims to verify whether an unknown speech utterance belongs to a specific speaker. According to the restriction of content, speaker verification can be categorized into text-dependent speaker verification and text-independent speaker verification. In order to enhance the discrimination of the speaker representation, existing methods focus on designing effective neural network structures and loss functions. These methods rely on speaker identity labelling of all training utterances. However, it is costly and expensive to annotate on large-scale speech data. The insufficient labeled training data may limit the performance of SV systems, especially when the utterances are recorded with different devices Self-supervised speaker representation learning has drawn attention extensively in recent years. Most of the work is based on the iterative "clustering-classification" learning framework, and the performance is sensitive to the pre-defined cluster number. Current self-supervised methods rely on the instance discrimination based on binary classification. That is, each training speech segment is regarded as an independent class, and the training criterion is set to discriminate its own transformed segment from a large number of other speech segments and their augmentations. A problem of current clustering-based self-supervised methods is that the system performance is unstable and sensitive to the pre-defined cluster numbers. Furthermore, the cluster number is difficult to estimate when dealing with large-scale unlabeled data. Moreover, the dogmatic cluster updating strategy leads to a poor generalization performance on unseen unlabeled datasets. In addition, clustering the whole large-scale dataset is time-consuming, and storing these pseudo labels and cluster centroids requires large amount of memory.

SUMMARY

In accordance with an aspect of an example embodiment, a method may include receiving, by a second encoder, an augmented speech segment of the original speech segment, generating, by the first encoder, a first speaker representation based on the original speech segment, generating, by the second encoder, a second speaker representation based on the augmented speech segment, and generating a contrastive loss based on the first speaker representation and the second speaker representation.

In accordance with an aspect of an example embodiment, an apparatus may include at least one memory configured to store computer program code and at least one processor configured to access said computer program code and operate as instructed by said computer program code, the computer program code including first receiving code configured to cause the at least one processor to receive, by a first encoder, an original speech segment, second receiving code configured to cause the at least one processor to receive, by a second encoder, an augmented speech segment of the original speech segment, first generating code configured to cause the at least one processor to generate, by the first encoder, a first speaker representation based on the original speech segment, second generating code configured to cause the at least one processor to generate, by the second encoder, a second speaker representation based on the augmented speech segment, and third generating code configured to cause the at least one processor to generate a contrastive loss based on the first speaker representation and the second speaker representation.

In accordance with an aspect of an example embodiment, a non-transitory computer-readable storage medium may store instructions that, when executed by at least one processor of a speech signal dereverberation processing device, cause the at least one processor to receive, by a first encoder, an original speech segment, receive, by a second encoder, an augmented speech segment of the original speech segment, generate, by the first encoder, a first speaker representation based on the original speech segment, generate, by the second encoder, a second speaker representation based on the augmented speech segment, and generate a contrastive loss based on the first speaker representation and the second speaker representation.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
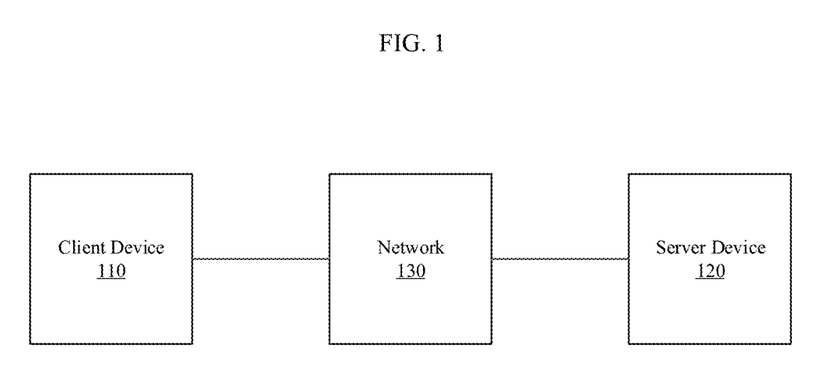
FIG. 1 is a diagram of a system according to an embodiment.

FIG. 1 is a diagram of a system according to an embodiment. FIG. 1 includes a client device 110, a server device 120, and a network 130. The client device 110 and the server device 120 may interconnect via through the network 130 providing wired connections, wireless connections, or a combination of wired and wireless connections.

The client device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
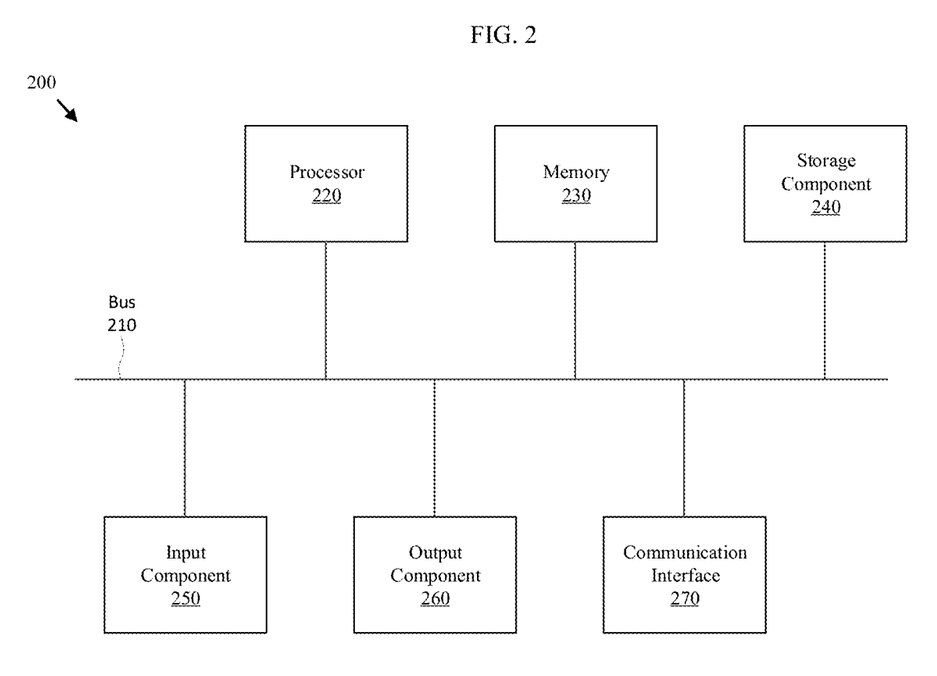
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the client device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided as disclosed herein are systems, methods, and devices configured to implement a progressive contrastive learning (PCL) algorithm to dynamically estimate the cluster number at each step based on the statistical characteristics of the data itself instead of a pre-defined number or generating from the whole dataset, such that the estimated number progressively approaches the ground-truth speaker number with the increasing of steps. The systems, methods, and devices may update the data queue by current generated augmented samples. For example, the memory queue may be updated using current augmented min-batch data. The systems, methods, and devices may introduce eigen decomposition to estimate the speaker number in the updated data queue. For example, an affinity matrix of the updated memory queue may be decomposed into eigenvalues to find potential factors for distinguishing speaker identity. Then, the number of speakers may be estimated according to the maximum eigengap in each step. The systems, methods, and devices may assign the queued data into the estimated cluster centroid and construct a contrastive loss, which encourages the speaker representation to be closer to its cluster centroid and away from others. For example, based on the estimated number, the queue data may be clustered by K-means to form the contrastive loss which compresses the diversity of samples to their corresponding factors and disperses the difference of a sample to other factors, simultaneously. Experimental results on large-scale speaker verification dataset demonstrate the effectiveness of the provided PCL compared with existing self-supervised approaches.

Since negative samples in the queue are randomly collected, the distribution of these samples may not be completely independent of the query sample, causing many negative pairs that may share the similar speaker identity information to be forced pulled away. Thus, the speaker representation is limited to encode the inherent speaker information of speech. To alleviate this issue, instead of obtaining a prior knowledge of the training data (i.e., an approximate estimation of total speaker number), as disclosed herein, the system enqueues the current augmented mini-batch containing speaker vectors extracted from a momentum encoder to the memory queue, and removes the oldest mini-batch in the queue. Then, the system investigates the statistical characteristics of the updated queue data $Q \in R^{M \times D}$ by computing its affinity matrix $A \in R^{M \times M}: A = QQ^T$, where the diagonal elements of A are set to 0. To extract the main potential speaker identity characteristics, the normalized graph Laplacian matrix of the affinity matrix A is decomposed into eigenvalues and corresponding a eigenvector matrix, where the sorted eigenvalues and eigenvector matrix are denoted as $s_1, \ldots s_M$ and $S \in R^{M \times M}$, respectively. Instead of a pre-defined cluster number, the system determines the cluster number k with the maximum eigenvalue gap, as in Equation (1).

$$k = \mathrm{argmax}(s_k - s_{k+1}), 1 \le k \le M-1 \quad (1)$$

In this way, the speaker number is dynamically generated from the queued data itself, instead of from a well-designed hyper-parameter based on prior knowledge. The system employs a clustering algorithm, such as K-means, to assign the queued samples into k clusters and estimate their corresponding centroids. During training, the model can learn more robust speaker representations progressively with a gradually precise estimation. Thus, the system may have a great generalization ability on additional or unseen large-scale data.

The system implements queue-level centroids, rather than centroids of clusters generated from the whole dataset, which are more portable and effective to investigate the speaker characteristics under the self-supervised learning framework. The noise contrastive estimation (NCE) PCL loss function may be formulated as in Equation (2):

$$L_{PCL} = \frac{1}{N} \sum_{i=1}^{N} -\log \frac{\exp(v_i \cdot c_i / \phi)}{\sum_{j=1}^{k} \exp(v_i \cdot c_j / \phi)} \quad (2)$$

where $c_i$ denotes the centroid of cluster i to which augmented sample $v'_i$ belongs, named positive centroid; otherwise, negative centroid, and $\phi$ is the dynamically estimated temperature coefficient, which suggests the concentration of speaker representation around their centroids. $\phi$ may be set to, as in Equation (3):

$$\frac{\sum_{Z=1}^{Z} |v_Z - c|}{Z \log(Z + \alpha)} \quad (3)$$

where Z is the total number of speakers embedding in this cluster, c is the cluster centroid, $\alpha$ indicates the smooth constant and may be set to 10. Furthermore, a weight may be used to retain the property of local smoothness and assist bootstrap clustering, as in Equation (4).

$$\alpha: L = \alpha L_{PCL} + (1-\alpha) L_{InfoNCE} \quad (4)$$

Figure 3:
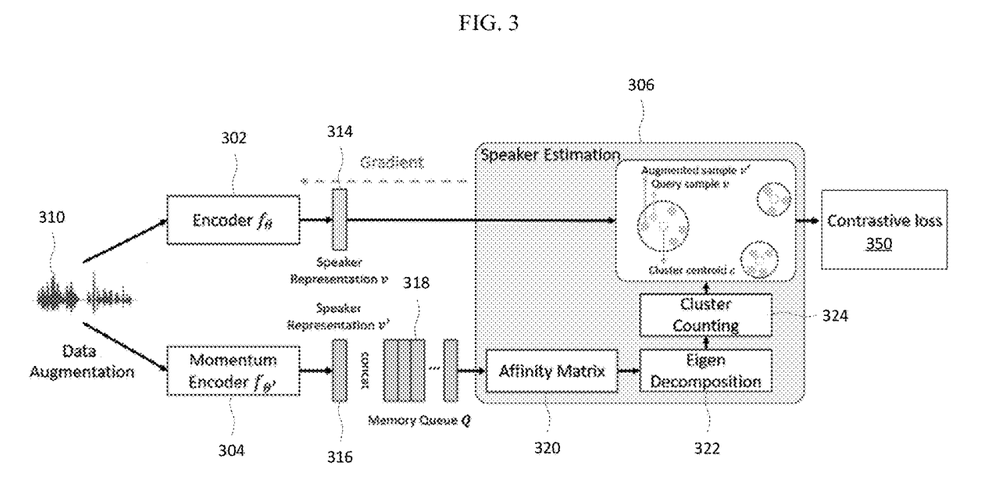
FIG. 3 is a diagram of a progressive contrastive learning (PCL) framework according to an embodiment.

FIG. 3 is a diagram of a PCL framework according to an embodiment. The framework includes an encoder $f_\theta$ 302, a momentum encoder $f_\theta$ 304, and a speaker estimation block 306. The original speech segment 310 is fed into the encoder $f_\theta$ 302 and an augmented speech segment of the original speech segment 310 (e.g., augmented after a data augmentation process) is fed into momentum encoder $f_\theta$ 304 to generate D-dimensional unit-norm speaker embedding vectors/representations $v \in R^{1 \times D}$ 314 and $v' \in R^{1 \times D}$ 316, respectively. A spectral clustering algorithm is used to estimate the number of speakers in the updated memory queue 318. A contrastive loss 350 is constructed based on the generated pseudo labels in the queue, using an affinity matrix 320, eigen decomposition 322 and cluster counting 324 as described above. Thus, the system encourages the query sample to be closer to its corresponding cluster centroid, compared to centroids of other clusters.

Table 1 shows the results of emphasized channel attention, propagation and aggregation in time delay neural network (ECAPA-TDNN) with the PCL disclosed herein, as well as other self-supervised learning (SSL) SV systems using different types of objective, including MoCo, MOBY (MoCo+BYOL) and ProtoNCE. Other self-supervised SV systems are listed for comparison.

TABLE 1

Results for SV systems on the Voxceleb1 dataset.

| Model | Objective | EER(%) | minDCF |
|---|---|---|---|
| ResNet34 [8] | Moco | 13.48 | N/R |
| ResNet [12] | CSL | 8.86 | 0.51 |
| TDNN[14] | MoCo | 8.63 | 0.64 |
| TDNN[14] | ProroNCE | 8.23 | 0.59 |
| E-TDNN[22] | MoCo | 7.3 | N/R |
| E-TDNN | MoCo | 8.31 | 0.67 |
| E-TDNN | MoBY | 8.20 | 0.66 |
| E-TDNN | ProtoNCE | 7.21 | 0.61 |
| E-TDNN | PCL | 7.11 | 0.61 |

N/R: Not report results.
CLS: contrastive self-supervised learning.
E-TDNN: ECAPA-TDNN.

Figure 4:
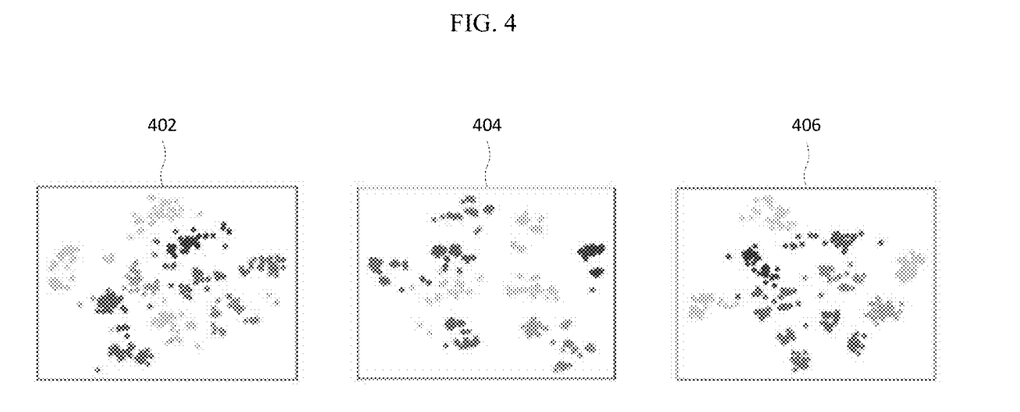
FIG. 4 is a diagram of visualizations of speaker representations according to an embodiment.

FIG. 4 is a diagram of visualizations of speaker representations according to an embodiment. FIG. 4 shows t-distributed stochastic neighbor embedding (T-SNE) visualizations of speaker representations with different SSL frameworks, such as MoCo 402, ProtoNCE 404 and the PCL 406 disclosed herein. Different shadings indicate different speakers.

The PCL optimized SV system disclosed herein learns to make tighter speaker clusters and increase the separateness between speakers. This suggests that the progressive contrastive learning based on the data characteristics may generate a more discriminative speaker representation, and is robust to the channel and noise variability.

Figure 5:
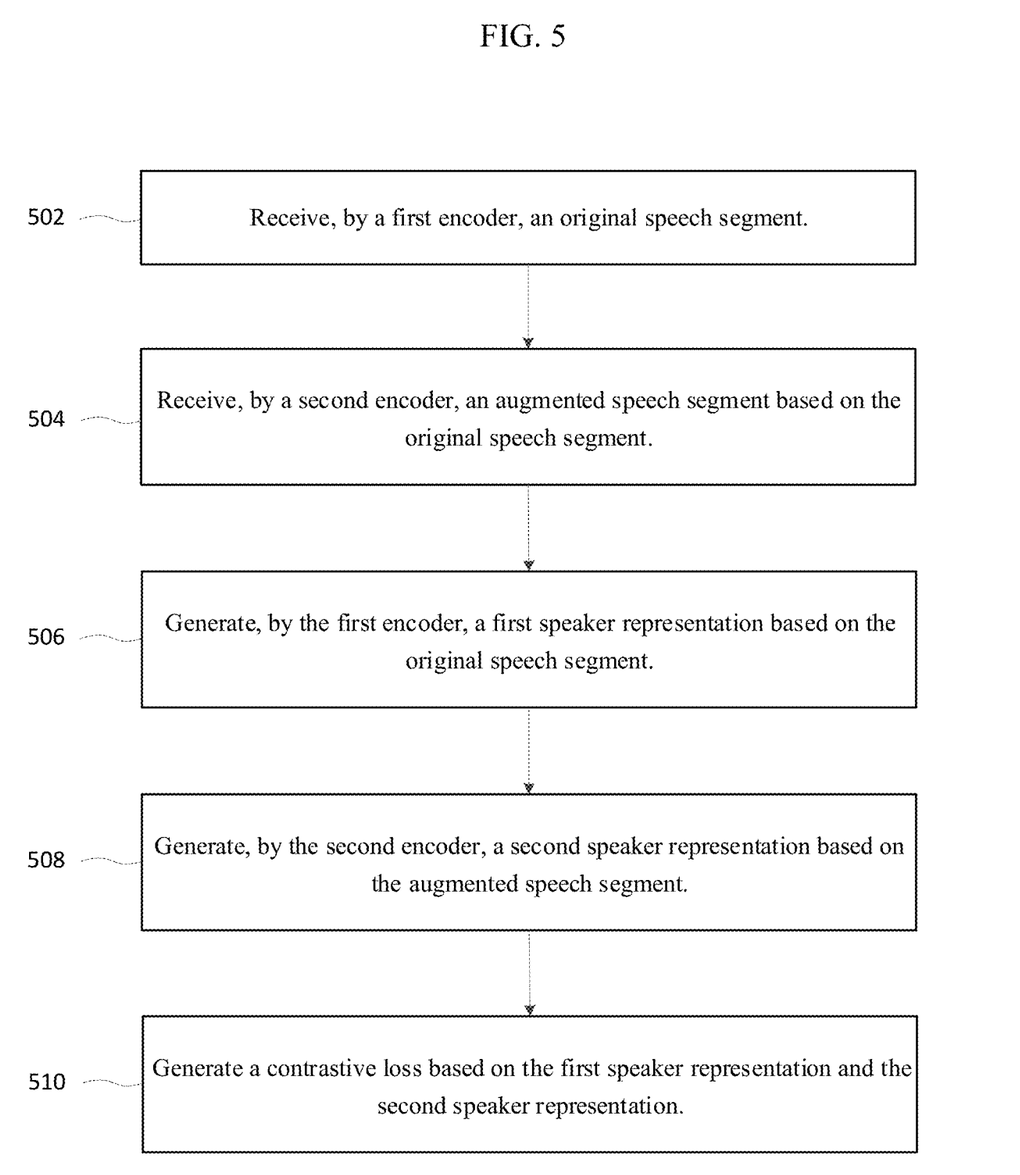
FIG. 5 is a flowchart of a method of PCL according to an embodiment.

FIG. 5 is a flowchart of a method of PCL according to an embodiment. In operation 502, the system receives, by a first encoder, an original speech segment. In operation 504, the system receives, by a second encoder, an augmented speech segment of the original speech segment. In operation 506, the system generates, by the first encoder, a first speaker representation based on the original speech segment. In operation 508, the system generates, by the second encoder, a second speaker representation based on the augmented speech segment. In operation 510, the system generates a contrastive loss based on the first speaker representation and the second speaker representation.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for speaker identification and verification, the method being executed by at least one processor, and the method comprising:
   training a dynamic clustering model for speaker identification and verification, the training comprising:
      receiving, by a first encoder, a plurality of original speech segments;
      receiving, by a second encoder, a plurality of augmented speech segments based on the plurality of the original speech segments,
      generating, by the first encoder, first speaker representations based on the plurality of original speech segments;
      generating, by the second encoder, second speaker representations based on the plurality of augmented speech segments;
      prior to estimating a cluster for the second speaker representations, inputting the second speaker representations into a memory queue;
      dynamically determining a number of clusters available for classification of the plurality of original speech segments based statistical characteristics of the second speaker representations in the memory queue;
      assigning a respective cluster to each second speaker representation among the second speaker representations, the cluster being one from among the dynamically determined number of clusters; and
      generating a contrastive loss based on the first speaker representations and the assigned second speaker representations, wherein the contrastive loss is based on queue-level centroids associated with the dynamically determined number of clusters instead of dataset-level centroids; and
   verifying an identity of a speaker of a first audio by applying the first audio as input into the trained dynamic clustering model for speaker identification and verification.

2. The method of claim 1, wherein the second encoder comprises a momentum encoder.

3. The method of claim 1, wherein the dynamically determining the number of clusters available for classification comprises updating the memory queue based on the second speaker representations.

4. The method of claim 3, wherein the dynamically determining the number of clusters available for classification further comprises generating an affinity matrix of the updated memory queue.

5. The method of claim 4, wherein the dynamically determining the number of clusters available for classification further comprises decomposing the affinity matrix into eigenvalues.

6. The method of claim 5, wherein the dynamically determining the number of clusters available for classification further comprises estimating a cluster number based on a maximum eigengap of the eigenvalues.

7. The method of claim 3, wherein updating the memory queue comprises removing an oldest mini-batch from the memory queue.

8. An apparatus for speaker identification and verification, comprising:
   at least one memory configured to store computer program code; and
   at least one processor configured to access said computer program code and operate as instructed by said computer program code, said computer program code comprising:
   training code configured to cause the at least one processor to train a dynamic clustering model for speaker identification and verification, the training code comprising:
      first receiving code configured to cause the at least one processor to receive, by a first encoder, a plurality of original speech segments;
      second receiving code configured to cause the at least one processor to receive, by a second encoder, a plurality of augmented speech segments based on the plurality of the original speech segments,
      first generating code configured to cause the at least one processor to generate, by the first encoder, first speaker representations based on the plurality of original speech segments;
      second generating code configured to cause the at least one processor to generate, by the second encoder, second speaker representations based on the plurality of augmented speech segments;
      prior to estimating a cluster for the second speaker representations, inputting the second speaker representations into a memory queue;

dynamically determining code configured to cause the at least one processor to dynamically determine a number of clusters available for classification of the plurality of original speech segments based statistical characteristics of the second speaker representations in the memory queue;

assigning code configured to cause the at least one processor to assign each second speaker representation among the second speaker representations to a cluster from among the dynamically determined number of clusters; and third generating code configured to cause the at least one processor to generate a contrastive loss based on the first speaker representations and the assigned second speaker representations, wherein the contrastive loss is based on queue-level centroids associated with the dynamically determined number of clusters instead of dataset-level centroids; and verifying code configured to cause the at least one processor to verify an identity of a speaker of a first audio by applying the first audio as input into the trained dynamic clustering model for speaker identification and verification.

9. The apparatus of claim 8, wherein the second encoder comprises a momentum encoder.

10. The apparatus of claim 8, wherein the dynamically determining code further comprises updating code configured to cause the at least one processor to update the memory queue based on the second speaker representation.

11. The apparatus of claim 10, wherein the dynamically determining code is further configured to cause the at least one processor to generate an affinity matrix of the updated memory queue.

12. The apparatus of claim 11, wherein the dynamically determining code is further configured to cause the at least one processor to generate the contrastive loss by decomposing the affinity matrix into eigenvalues.

13. The apparatus of claim 12, wherein the dynamically determining code is further configured to cause the at least one processor to generate the contrastive loss by estimating a cluster number based on a maximum eigengap of the eigenvalues.

14. The apparatus of claim 10, wherein the updating code is further configured to cause the at least one processor to update the memory queue removing an oldest mini-batch from the memory queue.

15. A non-transitory computer-readable storage medium storing instructions that, when executed by at least one processor for speaker identification and verification, cause the at least one processor to:

train a dynamic clustering model for speaker identification and verification, the training comprising:

receive, by a first encoder, a plurality of original speech segments;

receive, by a second encoder, a plurality of augmented speech segments based on the plurality of the original speech segments, generate, by the first encoder, first speaker representations based on the plurality of original speech segments;

generate, by the second encoder, second speaker representations based on the plurality of augmented speech segments;

prior to estimating a cluster for the second speaker representations, input the second speaker representations into a memory queue;

dynamically determine a number of clusters available for classification of the plurality of original speech segments based statistical characteristics of the second speaker representations in the memory queue;

assign a respective cluster to each second speaker representation among the second speaker representations, the cluster being one from among the dynamically determined number of clusters; and generate a contrastive loss based on the first speaker representations and the assigned second speaker representations, wherein the contrastive loss is based on queue-level centroids associated with the dynamically determined number of clusters instead of dataset-level centroids; and verify an identity of a speaker of a first audio by applying the first audio as input into the trained dynamic clustering model for speaker identification and verification.

16. The storage medium of claim 15, wherein the second encoder comprises a momentum encoder.

17. The storage medium of claim 15, wherein the instructions, when executed, cause the at least one processor to update the memory queue based on the second speaker representation.

18. The storage medium of claim 17, wherein the instructions, when executed, cause the at least one processor to generate an affinity matrix of the updated memory queue.

19. The storage medium of claim 18, wherein the instructions, when executed, cause the at least one processor to generate the contrastive loss by decomposing the affinity matrix into eigenvalues.

20. The storage medium of claim 19, wherein the instructions, when executed, cause the at least one processor to generate the contrastive loss by estimating a cluster number based on a maximum eigengap of the eigenvalues.

* * * * *